United States Patent Office 3,354,213
Patented Nov. 21, 1967

---

3,354,213
DERIVATIVES OF FATTY ACIDS
Eugene J. Miller, Jr., Wheaton, and Ago Mais, La Grange Park, Ill., assignors to Armour and Company, Chicago, Ill., a corporation of Delaware
No Drawing. Filed Sept. 22, 1964, Ser. No. 398,437
6 Claims. (Cl. 260—567.6)

This invention relates to novel derivatives of fatty acid and more particularly to a novel class of diquaternary compounds.

It has long been the desire of chemists to synthesize or to extract from natural substances compounds which not only possess the desirable physical and chemical properties of the long chain fatty acids, but also contain two or more reactive groups therein. With two or more reactive groups, the fatty compound would not only have good hydrophobic characteristics, but also have high potency, depending upon its reactive group type for surfactant, for polymeric or for other chemical activity.

Among the approaches made toward accomplishing such an objective, that disclosed in U.S. 2,813,113 is typical. There the oxidation of oleic acid $$[CH_3(CH_2)_7CH=CH(CH_2)_7COOH]$$

to azelaic acid $[HOOC(CH_2)_7COOH]$ is discussed. Unfortunately, chain cleavage occurs in such oxidation. This is undesirable because it cuts down the hydrophobic nature of the resultant compound.

Rowe and Swern of the U.S. Department of Agriculture, in the Journal of the American Oil Chemists Society periodical, volume 37, pages 661 to 668 (1960) report that unsaturated fatty acid may be carboxylated with carbon monoxide. Such a reaction would conserve the hydrophobic nature of the fatty acid, but apparently no further work was done toward discovering new difunctional fatty compounds. This is unfortunate because, as discussed below, it has been found that such difunctional compounds may be synthesized rather easily and they possess many attributes highly desirable for various chemical technologies.

Accordingly, an object of this invention is to provide novel difunctional fatty compounds which are useful in various chemical technologies.

Another object is to provide a novel class of fatty diquaternaries, more particularly diquaternaries of amino (lower alkyl) fatty amines.

Still another object is to provide novel methods for the manufacture of such diquaternaries.

A further object is to provide a novel class of compounds which are good anti-static agents for various plastics.

A still further object is to provide a novel class of compounds which are good emulsifiers for various technologies such as asphalt emulsification, textile treatment and the like.

Other objects of the invention will in part be obvious and will in part appear hereinafter.

The invention accordingly comprises the several steps and the relation of one or more of such steps with respect to each of the others, and the compound possessing the features, properties, and the relation of elements, which are exemplified in the following detailed disclosure, and the scope of the invention will be indicated in the claims.

It has now been found that a novel class of fatty diquaternaries may be prepared by quaternizing an aminoalkyl-fatty amine with an alkyl quaternizing agent such as alkyl halide or sulfate, preferably using a neutralizing agent such as sodium bicarbonate or any base capable of neutralizing the acid that is generated during quaternization. For example, by reacting aminomethylstearylamine with methyl chloride in the presence of sodium bicarbonate, the diquaternary is obtained. The latter is useful as an anti-stat, especially for polyethylene, polystyrene and similar plastics. It is also a good emulsifier.

Reference is now made to the following examples which illustrate synthesis of a specific diquaternary:

*Example I.—Methyl chloride quaternary of aminomethylstearylamine*

A two-liter Parr autoclave is charged with distilled aminomethylstearylamine (406.6 gms., 1.3 moles, NE=157), sodium bicarbonate (125 gms.) and 250 ml. isopropanol. The reactor is secured and methyl chloride is charged to a pressure of 75–80 p.s.i. at 68–69° C. These conditions are maintained for six hours with periodic venting to remove any $CO_2$ formed in the reaction. The salt is then removed by filtration, 250 gms. of sodium bicarbonate added and the reaction continued for another five hours at 75–80 p.s.i./68–69° C. The process of filtration and recharging with a final 125 gms. of sodium bicarbonate for further neutralization is repeated followed by a final five hours of reaction. The reaction mixture is then filtered to remove all solids and analyzed as an isopropyl solution of the diquaternary.

ANALYSIS

|  | Percent |
|---|---|
| Quaternary | 46.7 |
| Free amine | 1.2 |
| Amine HCl | 0.2 |

*Example II.—Methyl chloride quaternary of aminostearylamine*

A 500 ml. glass pressure reactor is charged with aminostearylamine (64.5 gms., 0.217 mole), sodium bicarbonate (80.5 gms., 0.96 mole) and 75 ml. isopropanol. The reactor is sealed and the temperature raised to 70° C. Methyl chloride is added to a pressure of 70 p.s.i.g. at 70° C. The pressure and temperature are maintained at 70 p.s.i.g./70° C. for ten hours with periodic venting of the carbon dioxide formed. The sodium chloride formed and excess sodium bicarbonate are then removed by filtration to yield an isopropanol solution of the diquaternary of aminostearylamine.

ANALYSIS

|  | Percent |
|---|---|
| Quaternary | 42.5 |
| Free amine | 0.23 |
| Amine HCl | 0.54 |

Among the amino- or aminoalkylfattyamines that may be quaternized in accordance with the method of this invention, those falling within the following formula are operable:

FORMULA I

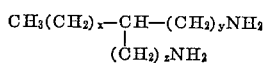

where $$x+y=6 \text{ to } 22$$
$$z=0 \text{ to } 2$$

These include the amino-, aminomethyl-, and the aminoethyl derivatives of fatty amines such as caprylylamine, caprylamine, laurylamine, myristylamine, palmitylamine, stearylamine, arachidylamine, behenylamine and lignocerylamine, or mixtures thereof such as derivable from natural fats and oils, such as tallow, soybean oil and coconut oil.

The neutralization agent that is useful, falls within a relatively wide scope of compounds. Among such compounds are the alkali metal bases such as sodium or potassium bicarbonate, sodium or potassium carbonate, sodium or potassium hydroxide and the like. A concentration above two molecular equivalents per equivalent of diamine quaternized is needed.

The quaternizing agents that may be used are methyl chloride, methyl bromide, methyl iodide, methyl sulfate, ethyl chloride, ethyl bromide, ethyl iodide, ethyl sulfate, benzyl chloride, benzyl bromide, benzyl iodide and the like.

Any reaction solvent may be used, such as methanol, ethanol, isopropanol, butanol or any other suitable polar solvent.

The diquaternaries that may be formed by the method of this invention are those which fall within the following formula:

FORMULA II $$CH_3-(CH_2)_x-CH-(CH_2)_y[NR_3]^+X^-$$
$$\quad\quad\quad\quad\quad\quad |$$
$$\quad\quad\quad\quad\quad (CH_2)_z[NR_3]^+X^-$$

where
$x+y=6$ to $22$
$z=0$ to $2$
$X=Cl^-$, $\frac{1}{2}(SO_4^{--})$, $Br^-$, $I^-$, and
$R=CH_3-$, $CH_3CH_2-$,

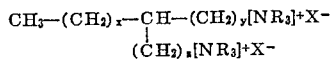

or mixtures thereof.

Among compounds which fall within the above formula are the methyl chloride diquaternary of aminomethylcaprylamine, the methyl sulfate diquaternary of aminoethylundecylamine, the methyl chloride diquaternary of aminostearylamine, and the methyl chloride diquaternary of aminomethylstearylamine.

It will thus be seen that the objects set forth above, among those made apparent from the preceding description, are efficiently attained and, since certain changes may be made in carrying out the above method and in the compounds set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

What is claimed is:
1. The diquaternaries falling within the following formula:

$$CH_3-(CH_2)_x-CH-(CH_2)_y[NR_3]^+X^-$$
$$\quad\quad\quad\quad\quad\quad |$$
$$\quad\quad\quad\quad\quad (CH_2)_z[NR_3]^+X^-$$

where
$x+y=6$ to $22$
$z=0$ to $2$
$X=Cl^-$, $\frac{1}{2}(SO_4^{--})$, $Br^-$, $I^-$, and
$R=CH_3-$, $CH_3CH_2-$

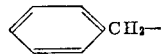

or mixtures thereof.

2. The methyl chloride diquaternary of aminomethylpalmitylamine of the following formula:

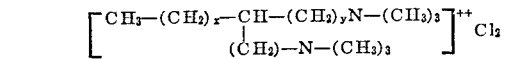

where $x+y=14$.

3. The methyl sulfate diquaternary of aminothylundecylamine of the following formula:

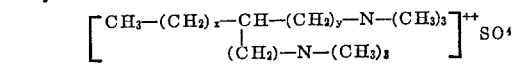

where $x+y=9$.

4. The methyl chloride diquaternary of aminostearylamine of the following formula:

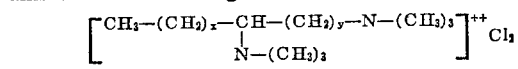

where $x+y=16$.

5. The methyl chloride diquaternary of aminomethylstearylamine of the following formula:

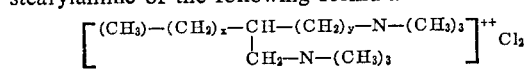

where $x+y=16$.

6. The methylchloride, bromide or iodide diquaternary of mixed aminofatty amines falling within the following formula:

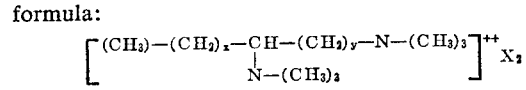

where
$x+y=6$ to $22$, and
X is a member of the group consisting of $Cl^-$, $Br^-$, and $I^-$.

References Cited

UNITED STATES PATENTS 2,775,617  12/1956  Shapiro et al. _____ 260—567.6
2,950,318   8/1960  Shapiro _____ 260—567.6
3,073,864   1/1963  Harrison et al. ____ 260—567.6

FOREIGN PATENTS 685,085  12/1952  Great Britain.

OTHER REFERENCES

Braun et al.: Ber. Deut. Chem., vol. 64, pp. 2617–2621 (1931).

Overberger et al.: J. Am. Chem. Soc., vol. 73, pp. 2540–2543 (1951).

CHARLES B. PARKER, *Primary Examiner.*

F. D. HIGEL, *Assistant Examiner.*